(12) United States Patent
Haney et al.

(10) Patent No.: US 8,746,155 B2
(45) Date of Patent: *Jun. 10, 2014

(54) EDGE AND CORNER FOR A STRUCTURE CONSTRUCTED FROM BLOW-MOLDED PLASTIC

(71) Applicant: Lifetime Products, Inc., Clearfield, UT (US)

(72) Inventors: Thayne B. Haney, Syracuse, UT (US); Jacob Kearl, Plain City, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/939,048

(22) Filed: Jul. 10, 2013

(65) Prior Publication Data

US 2013/0291481 A1     Nov. 7, 2013

Related U.S. Application Data

(63) Continuation of application No. 13/669,280, filed on Nov. 5, 2012, which is a continuation of application No. 13/270,141, filed on Oct. 10, 2011, now Pat. No. 8,302,541, which is a continuation of application No. 12/351,827, filed on Jan. 10, 2009, now Pat. No. 8,033,228, which is a continuation of application No. 11/051,933, filed on Feb. 4, 2005, now Pat. No. 7,475,643, which is a continuation-in-part of application No. 29/198,778, filed on Feb. 4, 2004, now Pat. No. Des. 509,386, and a continuation-in-part of application No. 10/409,273, filed on Apr. 8, 2003, now Pat. No. 7,111,563.

(60) Provisional application No. 60/541,639, filed on Feb. 4, 2004.

(51) Int. Cl.
*A47B 3/00* (2006.01)

(52) U.S. Cl.
USPC .............................. 108/132; 108/27; 108/129

(58) Field of Classification Search
USPC ........... 108/132, 27, 129, 131, 161, 115, 901, 108/133; 248/188.6, 188.8
See application file for complete search history.

(56) References Cited

U.S. PATENT DOCUMENTS 1,165,991 A    12/1915   Maggs
2,059,255 A    11/1936   Lassiat
(Continued)

FOREIGN PATENT DOCUMENTS

| CA | 2450012 | 5/2000 |
|---|---|---|
| JP | 7-158263 | 6/1995 |
| JP | 2001-38796 | 2/2001 |

OTHER PUBLICATIONS

U.S. Appl. No. 60/371,486, filed Apr. 9, 2002, Strong et al.

(Continued)

*Primary Examiner* — Jose V Chen
(74) *Attorney, Agent, or Firm* — Maschoff Brennan

(57) ABSTRACT

A structure constructed from plastic may include one or more reinforcing portions that are sized and configured to prevent damage to the structure. For example, the structure may be a table top constructed from blow-molded plastic and the table top may include a body with one or more corners. The corners may include an interior portion and an exterior portion, and reinforcement portions may be sized and configured to help prevent damage to the corners of the table top. In addition, one or more depressions may be at least partially disposed within the reinforcement portions, if desired. The reinforcement portions, for example, may include one or more inwardly and/or outwardly extending portions.

20 Claims, 12 Drawing Sheets

(56) References Cited

U.S. PATENT DOCUMENTS

| | | | |
|---|---|---|---|
| 2,689,158 A | 9/1954 | Mahr | |
| 3,357,729 A | 12/1967 | Krueger | |
| 3,635,432 A | 1/1972 | Hollander | |
| 3,718,306 A | 2/1973 | Murray | |
| 3,999,490 A | 12/1976 | Rocker et al. | |
| 4,503,780 A | 3/1985 | Apissomian | |
| 4,563,374 A | 1/1986 | Treber et al. | |
| 4,606,170 A * | 8/1986 | Mendenhall | 108/27 |
| 4,727,816 A | 3/1988 | Virtue | |
| 4,759,296 A | 7/1988 | Simpson | |
| 4,924,782 A * | 5/1990 | Nichoalds | 108/27 |
| 5,014,628 A | 5/1991 | Roberts | |
| 5,050,583 A * | 9/1991 | Chapek et al. | 108/27 |
| 5,271,338 A | 12/1993 | Bonham | |
| 5,311,825 A | 5/1994 | Bonham | |
| 5,348,384 A | 9/1994 | Hull et al. | |
| 5,362,063 A * | 11/1994 | Cummings | 108/27 |
| 5,440,857 A * | 8/1995 | Shanok et al. | 108/27 |
| 5,479,864 A * | 1/1996 | Kemp | 108/27 |
| 5,496,609 A * | 3/1996 | Michelstein | 108/27 |
| 5,570,484 A | 11/1996 | Ogle | |
| 5,623,882 A | 4/1997 | Price | |
| 5,636,578 A | 6/1997 | Rizzi | |
| 5,678,380 A | 10/1997 | Azzar | |
| 5,678,491 A | 10/1997 | Price et al. | |
| 5,694,865 A | 12/1997 | Raab | |
| 5,722,746 A * | 3/1998 | Hull et al. | 108/27 |
| 5,732,637 A | 3/1998 | Raab | |
| 5,809,901 A * | 9/1998 | Gutzmer | 108/27 |
| 5,868,081 A | 2/1999 | Raab | |
| 5,921,623 A | 7/1999 | Nye et al. | |
| 5,947,037 A | 9/1999 | Hornberger et al. | |
| D414,626 S | 10/1999 | Collins et al. | |
| 5,983,807 A | 11/1999 | Tarnay et al. | |
| 6,058,853 A | 5/2000 | Pinch | |
| 6,058,854 A | 5/2000 | Tarnay et al. | |
| 6,112,674 A | 9/2000 | Stanford | |
| 6,214,436 B1 * | 4/2001 | Catta et al. | 108/27 |
| 6,378,831 B1 * | 4/2002 | Copeland, Jr. | 108/27 |
| D468,135 S | 1/2003 | Ashby et al. | |
| 6,520,094 B2 | 2/2003 | Wen | |
| 6,615,743 B2 | 9/2003 | Nien | |
| 6,622,644 B2 | 9/2003 | Buono | |
| 6,694,897 B2 | 2/2004 | Lou-Hao | |
| D487,205 S | 3/2004 | Mower et al. | |
| D489,557 S | 5/2004 | Strong et al. | |
| 6,732,663 B2 | 5/2004 | Tsai | |
| D499,283 S | 12/2004 | Winter et al. | |
| 6,837,171 B1 | 1/2005 | Clark et al. | |
| 6,877,441 B2 | 4/2005 | Zheng | |
| 6,915,748 B2 | 7/2005 | Stanford | |
| D509,386 S | 9/2005 | Haney | |
| 7,069,865 B2 | 7/2006 | Strong et al. | |
| 7,096,799 B2 | 8/2006 | Strong et al. | |
| 7,111,563 B2 | 9/2006 | Strong | |
| 7,299,754 B2 | 11/2007 | Stanford et al. | |
| 7,475,643 B2 * | 1/2009 | Haney et al. | 108/132 |
| 7,707,947 B2 | 5/2010 | Winter et al. | |
| D640,487 S | 6/2011 | Bennett | |
| 7,975,623 B1 | 7/2011 | Gassick et al. | |
| 8,033,228 B2 * | 10/2011 | Haney et al. | 108/132 |
| 8,042,475 B2 | 10/2011 | Larcom et al. | |
| 8,302,541 B2 | 11/2012 | Haney et al. | |
| 2003/0005864 A1 | 1/2003 | Wen | |
| 2003/0106474 A1 | 6/2003 | Buono | |
| 2003/0177962 A1 | 9/2003 | Stanford | |
| 2003/0213416 A1 | 11/2003 | Strong et al. | |
| 2003/0233967 A1 | 12/2003 | Lin | |
| 2004/0031422 A1 | 2/2004 | Wong | |
| 2005/0160950 A1 | 7/2005 | Haney | |
| 2005/0274304 A1 | 12/2005 | Strong | |
| 2005/0279260 A1 | 12/2005 | Stanford | |
| 2006/0000394 A1 | 1/2006 | Stanford et al. | |
| 2006/0236902 A1 | 10/2006 | Haney | |
| 2008/0026881 A1 | 1/2008 | Stanford et al. | |

OTHER PUBLICATIONS

U.S. Appl. No. 10/409,273, filed Apr. 8, 2003, Strong.
U.S. Appl. No. 60/541,639, filed Feb. 4, 2004, Haney et al.
U.S. Appl. No. 11/051,993, filed Feb. 4, 2005, Haney.
U.S. Appl. No. 60/660,061, filed Mar. 9, 2005, Haney.
U.S. Appl. No. 11/373,582, filed Mar. 9, 2006, Haney.
U.S. Appl. No. 11/373,582, filed Mar. 9, 2006, Haney et al.
U.S. Appl. No. 29/279,299, filed Apr. 25, 2007, VanNimwegen.
U.S. Appl. No. 29/279,299, filed Apr. 25, 2007, VanNimwegen et al.
U.S. Appl. No. 12/042,250, filed Mar. 4, 2008, Larcom.
U.S. Appl. No. 12/042,250, filed Mar. 4, 2008, Larcom et al.
U.S. Appl. No. 12/110,163, filed Apr. 25, 2008, VanNimwegen et al.
U.S. Appl. No. 12/110,163, filed Apr. 25, 2008, VanNimwegen.
U.S. Appl. No. 12/126,615, filed May 23, 2008, Larcom.
U.S. Appl. No. 29/390,471, filed Apr. 25, 2011, Winter et al.
U.S. Appl. No. 29/391,721, filed May 12, 2011, Bennett.
U.S. Appl. No. 29/403,327, filed Oct. 4, 2011, Winter et al.
Office Action from U.S. Appl. No. 11/373,582, dated Oct. 7, 2008.
Notice of Allowance dated Sep. 18, 2008 cited in related U.S. Appl. No. 11/051,933.
Office Action dated Apr. 2, 2008 cited in related U.S. Appl. No. 11/051,933.
Office Action dated Aug. 2, 2007 cited in related U.S. Appl. No. 11/051,933.
Office Action dated Nov. 9, 2005 cited in U.S. Appl. No. 10/409,273.
International Search Report and Written Opinion from International Application No. PCT/US2008/061693, dated Aug. 18, 2008.
International Search Report and Written Opinion from International Application No. PCT/US2008/061693, dated Aug. 20, 2008.
Office Action from U.S. Appl. No. 12/110,163, dated Oct. 21, 2009.
Notice of Allowability from U.S. Appl. No. 11/373,582, dated Feb. 23, 2010.
Notice of Allowability from U.S. Appl. No. 11/373,582, dated Jan. 12, 2010.
Office Action from U.S. Appl. No. 11/373,582, dated Nov. 2, 2009.
Office Action from U.S. Appl. No. 12/110,163 dated May 25, 2010.
Notice of Allowance from U.S. Appl. No. 13/270,141 dated Jul. 18, 2012.
Office Action from U.S. Appl. No. 13/270,141 dated Jan. 30, 2012.
Office Action from U.S. Appl. No. 13/669,280 dated Feb. 12, 2013.
Notice of Allowability from U.S. Appl. No. 13/669,280 dated Jul. 19, 2013.

* cited by examiner

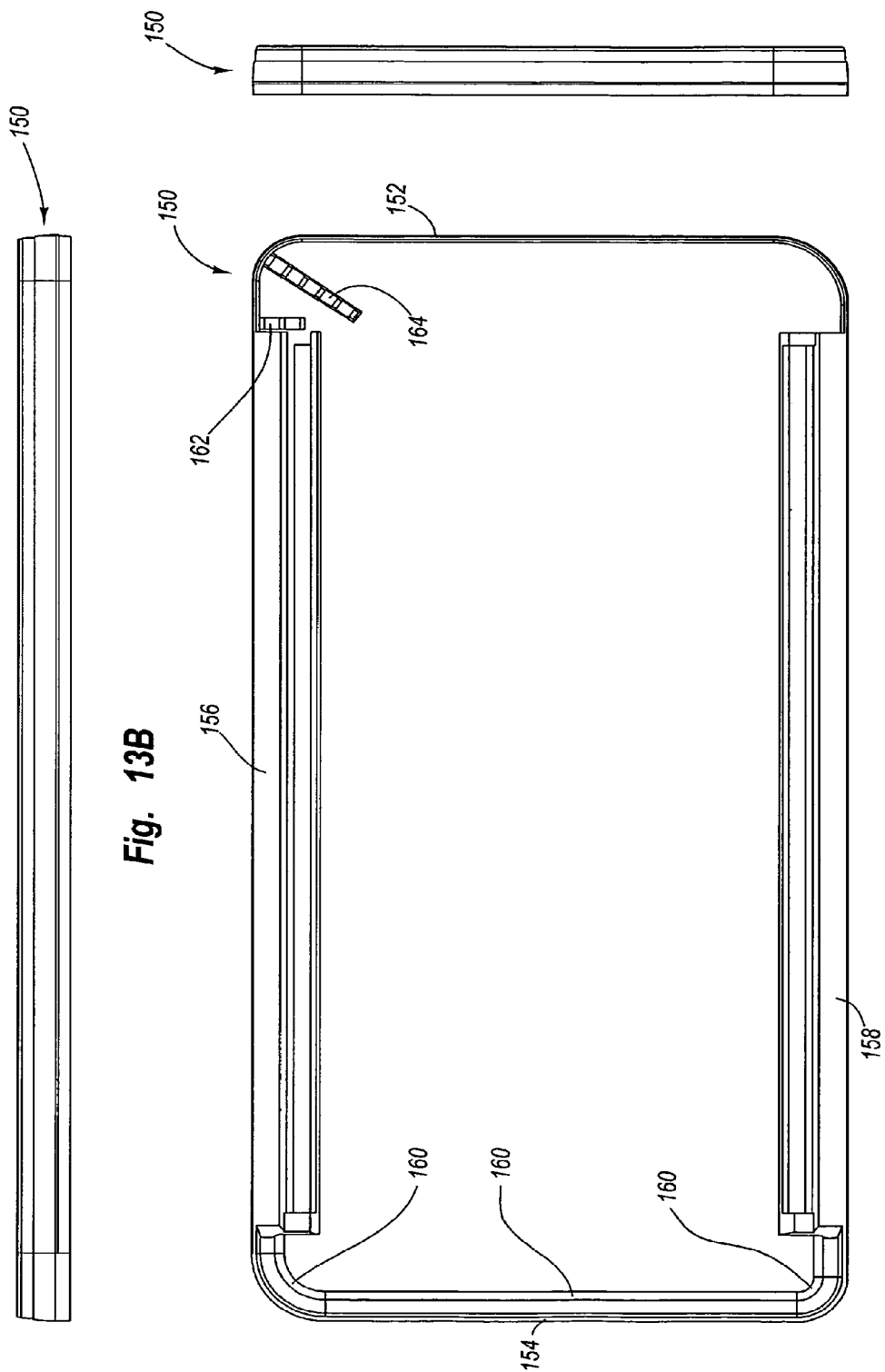

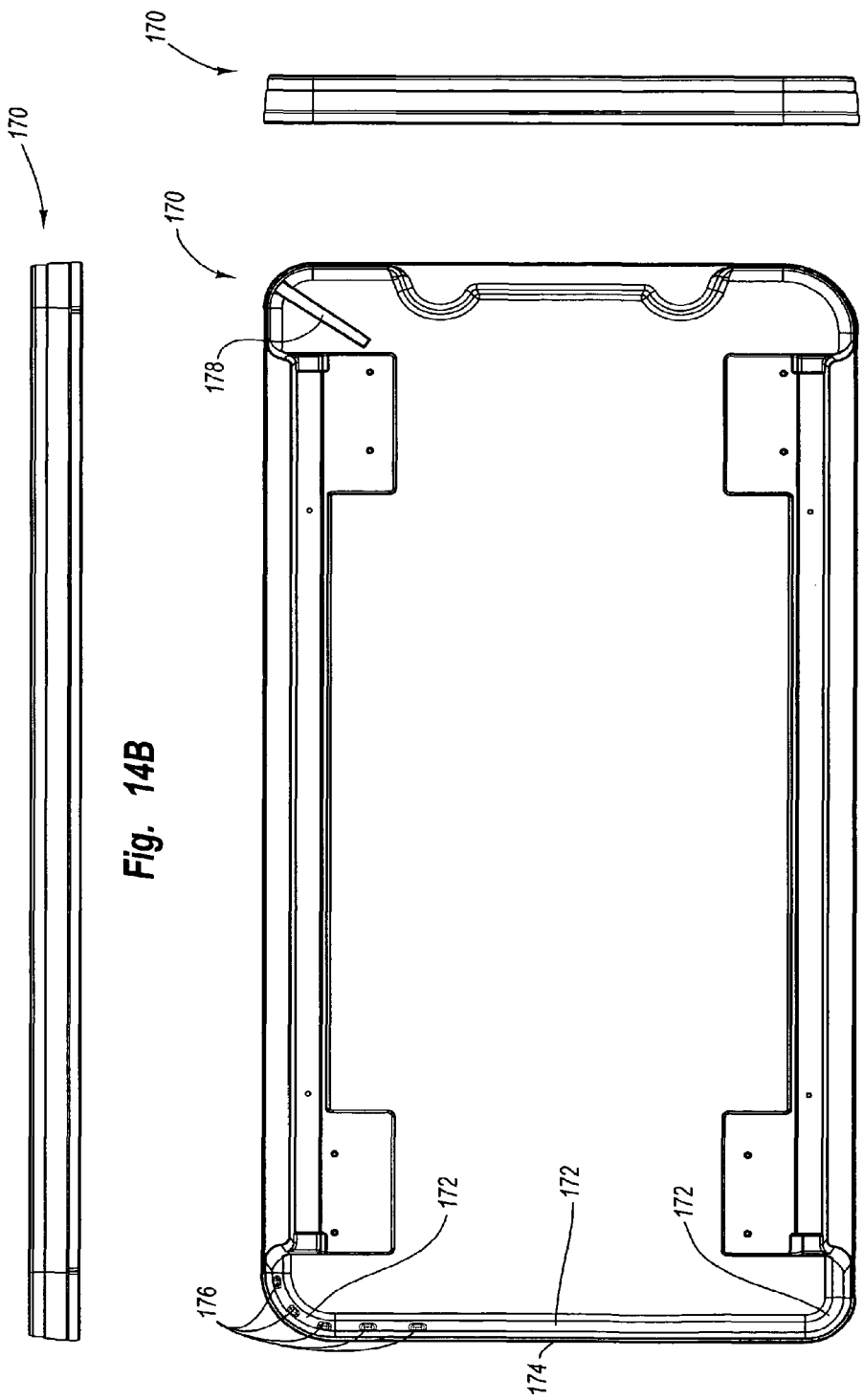

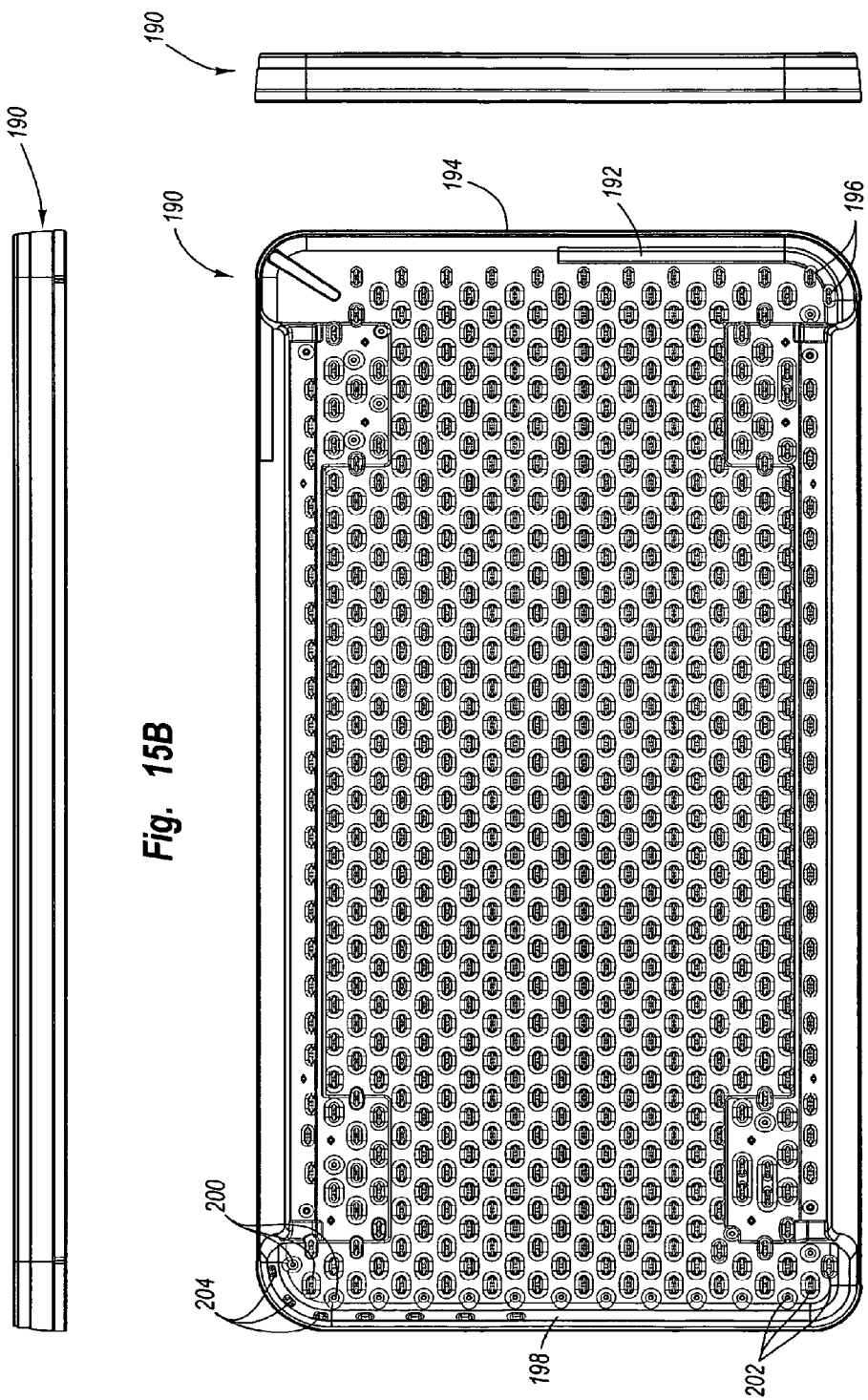

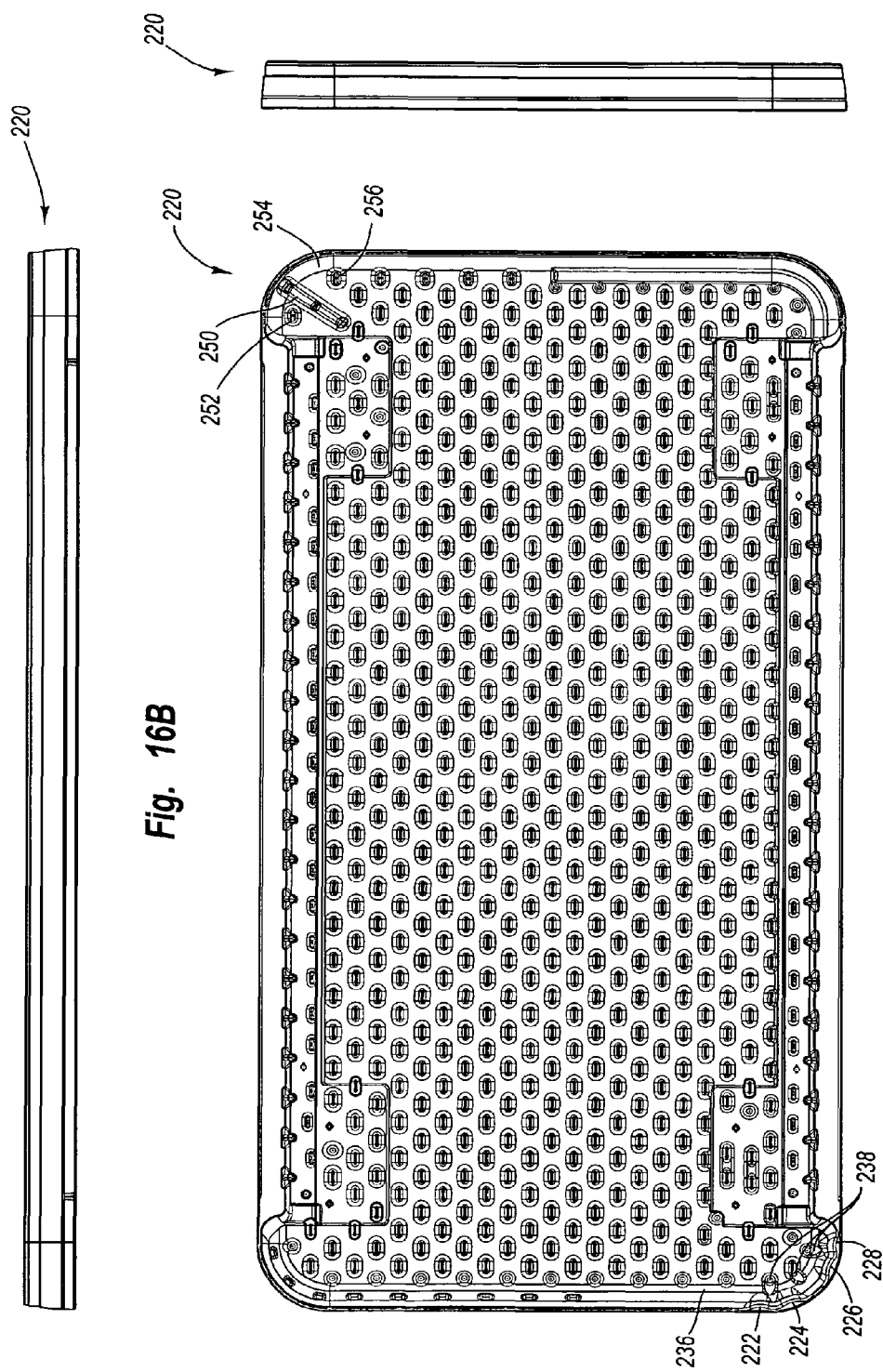

EDGE AND CORNER FOR A STRUCTURE CONSTRUCTED FROM BLOW-MOLDED PLASTIC

CROSS-REFERENCE TO RELATED APPLICATIONS

The present application is a continuation of U.S. patent application Ser. No. 13/669,280, filed on Nov. 5, 2012, now U.S. Pat. No. 8,578,865; which is a continuation of U.S. patent application Ser. No. 13/270,141, filed on Oct. 10, 2011, now U.S. Pat. No. 8,302,541; which is a continuation of U.S. patent application Ser. No. 12/351,827, filed on Jan. 10, 2009, now U.S. Pat. No. 8,033,228; which is a continuation of U.S. patent application Ser. No. 11/051,933, filed on Feb. 4, 2005, now U.S. Pat. No. 7,475,643.

U.S. Pat. No. 7,475,643 is a continuation-in-part of U.S. design patent application Ser. No. 29/198,778, filed on Feb. 4, 2004, now U.S. Pat. No. D509,386; a continuation-in-part of U.S. patent application Ser. No. 10/409,273, filed on Apr. 8, 2003, now U.S. Pat. No. 7,111,563; and claims priority to and the benefit of U.S. provisional patent application Ser. No. 60/541,639, entitled CORNER FOR A TABLE TOP, which was filed on Feb. 4, 2004. Each of these applications and patents is incorporated by reference in its entirety.

BACKGROUND OF THE INVENTION

1. Field of the Invention

The present invention is generally related to structures constructed from plastic and, in particular, to structures constructed from blow-molded plastic.

2. Description of Related Art

Many different types of tables are well known and used for a variety of different purposes. For example, conventional tables may include legs that are pivotally attached to the table top and the legs may be movable between a use position in which the legs extend outwardly from the table top and a storage position in which the legs are folded against the table top. Large, portable tables with folding legs are often referred to as "banquet tables" and these tables are often used in assembly halls, banquet halls, convention centers, hotels, schools, churches and other locations where large groups of people meet. Because these tables are portable, the tables can be positioned in an assortment of different configurations and used in a variety of settings. When the tables are no longer needed, the tables can be moved or stored.

Banquet tables are often used by various organizations and groups because they allow effective and efficient use of space. For example, banquet tables may be used in large multipurpose areas such as school gymnasiums, meeting halls and hotel conference rooms to allow groups of people to meet. After the meetings are completed, the tables can be folded into the storage position and stowed in a relatively small space. This allows the gymnasiums, meeting halls and conference rooms to be used for other purposes. Thus, banquet tables allow groups and organizations to efficiently use a particular space.

Conventional banquet tables with legs that are foldable between a use position and a storage position may also be used in a variety of other locations. For example, these known tables may provide immediate table space and/or workspace in a house, apartment, garage, shed and the like. The foldable legs allow the tables to be conveniently set up, taken down, stored and transported whenever and wherever the user chooses.

It is known to construct conventional banquet tables from relatively heavy materials such as wood or metal, which makes the tables heavy and difficult to move. In particular, the table tops of conventional banquet tables are often made from fiber board, particle board, or plywood; and these known table tops may include a plastic or Formica-type surface laminated onto the upper surface of the table top to create a working surface. Disadvantageously, many of these conventional banquet tables are not very strong and are unable to support a desired amount of weight. In order to increase the strength of these tables, thicker and heavier table tops are often used. Unfortunately, the thicker and heavier table tops further increase the weight of the tables. As a result, many conventional banquet tables with wooden table tops are undesirably heavy, and two or more people are often required to move these types of tables.

In order to prevent the middle portion of conventional banquet tables from sagging, it is known to attach a metal frame to the bottom surface of the wooden table top. These known metal frames often included two side rails that extended along the longitudinal length of the table top and the metal frames are frequently attached to the table top by a plurality of screws. Disadvantageously, the structural integrity of the table top may be decreased by the holes created by the plurality of screws, and this may allow the table to collapse and fail. In addition, because the screws are typically individually attached to the table top, that may significantly increase the amount of the time required to construct the table.

Conventional banquet tables are often six or eight feet in length and two or three feet in width. Thus, banquet tables are often difficult to move because of their large size and inherent bulkiness. In addition, as discussed above, these conventional banquet tables are often very heavy. Accordingly, if these unwieldy and heavy conventional tables are inadvertently dropped, tipped over, or mishandled while moving or using the tables, then injury could result.

It is known to construct banquet tables from plastic or other lightweight materials in an attempt to decrease the weight of the tables. Many of these lighter-weight tables, however, lack the strength and sturdiness of the heavier-weight tables. Thus, many lighter-weight tables require complex support mechanisms and one or more support braces to increase the strength and sturdiness of the table, which undesirably increases the weight and complexity of the tables.

Conventional banquet tables generally include legs that are attached to the table tops by a number of mechanical fasteners such as screws or bolts, whether the table tops are constructed from wood, plastic or metal. Disadvantageously, attaching the legs to the table tops by screws or bolts creates a number of holes in the table tops. As discussed above, these holes may decrease the structural integrity of the table top and may create undesirable stress concentrations in the table top. The holes may also create weakness or failure points that allow the table to give way and collapse. It is also known to bond a portion of the support structure that attaches the table legs to the table top by adhesives such as glue, epoxy resins or other suitable types of bonding agents. The bonding of the table leg support structure to the table top, however, may decrease the structural integrity of the table top. Significantly, if the mechanical fasteners or adhesive connection of the legs to the table top fails, then the table may collapse. These conventional tables may be difficult to fix or repair, especially if the leg support structure of the table top is damaged or pulled away from the remaining portion of the table top.

The use of mechanical fasteners to attach the legs to the table top undesirably increases the number of parts required to construct the table, which may increase the time required to assemble the table. In addition, many conventional tables required the legs to be positioned against the underside of the table top and then attached to the table top by the mechanical fasteners or glue. This increases the difficulty of the manufacturing process because the legs and table top must first be held in the desired positions and then the legs must be fastened to the table top. In particular, if mechanical fasteners are used to attach the legs to the table top, mating surfaces such as holes in the legs and corresponding threaded openings in the table top must be carefully aligned before the legs can be attached to the table top. Accordingly, many conventional tables require one or more persons to hold the legs and table top in the desired locations, and another person to fasten the legs to the table top. This process is undesirably time consuming and labor intensive. Alternatively, a single person may be used to attach the legs to the table top, but this process is difficult to perform rapidly and without any errors.

It is also known to use complex attachment mechanisms to facilitate attachment of the legs to the table tops. Disadvantageously, these complex attachment mechanisms are generally heavier, more difficult to install, and more expensive. In addition, these complex attachment mechanisms are often more difficult to use than conventional mechanical fasteners or adhesives.

These disadvantages are often compounded because conventional tables with folding legs typically require separate and distinct attachment mechanisms for attaching each leg or a pair of legs to the table top. That is, because most conventional banquet tables include a leg or a pair of legs attached to each end of the table, a number of holes or attachment points are required to attach the legs to the table top. Accordingly, many conventional tables have two or four separate points of attachment in order to attach the table legs to the table top. Thus, conventional banquet tables often include a plurality of holes in each end of the table top, and these holes may undesirably allow the table to fail.

As discussed above, in order to decrease the weight of conventional tables, table tops can be constructed from lightweight materials. Disadvantageously, these light-weight table tops frequently require reinforcing members or other structural parts to strengthen the table top. These additional parts may increase the strength of the table top, but these additional parts also increase the weight of the table. These additional parts may also increase manufacturing costs and require additional time to assemble the table. Furthermore, these additional parts may have sharp edges that can injure the user's legs, arms or other body parts.

Disadvantageously, conventional tables constructed from light-weight materials may be easily damaged. For example, the corners of many conventional light-weight tables are not very strong and are susceptible to being dented or smashed. In particular, the corners of these tables may be easily damaged if the table is dropped or if the corner of the table is inadvertently struck with another object. The dented or damaged corners of these conventional table tops are often very difficult or impossible to repair or replace.

BRIEF SUMMARY OF THE INVENTION

A need therefore exists for a structure that eliminates the above-described disadvantages and problems.

One aspect is a structure that is constructed from plastic. Desirably, the structure is constructed from blow-molded plastic, but the structure may also be constructed from other materials and processes such as rotary molding, injection molding and the like. Advantageously, the structure may include one or more corners and/or edges that are resistant to damage. In particular, the corners and edges may be resistant to damage if, for example, it is dropped, hit or impacted during manufacturing, shipping or use.

The structure described below and shown in the accompanying figures is an exemplary embodiment of a table and, in particular, the table top of the table. It will be appreciated, however, that any suitable type of table may be used. In addition, it will be appreciated that the structure does not have to be a table and other suitable types of structures may also be used.

Another aspect is a table that may include a table top constructed from blow-molded plastic. Significantly, if the table top is constructed from blow-molded plastic, it may be easily formed into any desired configuration, shape, size and design depending, for example, upon the intended use and/or configuration of the table. The blow-molded table top may be also generally weather resistant and temperature insensitive, which allows the table to be used in a wide variety of locations and environments. In addition, the blow-molded table top may be durable, long-lasting, and it generally does not corrode, rust or otherwise deteriorate over time. Further, because the blow-molded table top may be relatively strong, it can be used to support a relatively large amount of weight. Significantly, the blow-molded table top may form a structural member of the table and/or a frame or other structure may be used to support the table top.

Advantageously, the blow-molded plastic table top may be relatively strong because it may include two or more opposing walls or surfaces that are separated by a given distance. The opposing walls help create a high-strength, rigid table top. In addition, because the interior portion of the table top may be generally hollow, that creates a lightweight table top. Thus, the blow-molded table top can be both lightweight and strong. The blow-molded table top may also be lightweight and strong even if the interior portion is filled with materials such as foam.

Still another aspect is a table top that may include one or more depressions, "tack-offs" or "kiss-offs." The depressions, which can extend from one surface towards another surface, may be desirably sized and configured to increase the strength and/or rigidity of the table top. Preferably, the depressions extend from one surface and contact or engage an opposing surface, but the depressions do not have to contact or engage another surface. If desired, the depressions may be formed in the bottom surface of the table top so that the depressions are generally not visible. The depressions, however, may be formed in the top surface and/or any other suitable portions of the table top. For example, one or more depressions may be formed in the top surface of the table top and one or more depressions may be formed in the bottom surface of the table top, and these opposing depressions may be generally aligned. At least a portion of these opposing depressions may contact or engage each other, but the opposing depressions do not have to touch or engage.

Significantly, the blow-molded table top may be quickly and easily constructed. Advantageously, the blow-molding process allows the opposing walls, depressions and other desired features to be quickly and easily formed in the table top. In addition, the blow-molded table top can be constructed as an integral, one-piece structure to help create a strong and rigid table top, but the table top could also be constructed from two or more pieces that are interconnected.

A further aspect is a table top that may be constructed with thin outer walls, which may decrease the amount of plastic required to construct the table top. As discussed above, the opposing walls and depressions may allow a strong and sturdy table top to be constructed. These and other features may also allow the table top to be constructed with relatively thin outer walls, which may reduce the amount of plastic required to construct the table top. This may save manufacturing costs and reduce the amount of resources required to construct the table top. The thin outer walls may also allow the table top to be cooled more quickly during the manufacturing process, which may allow the table tops to be manufactured more quickly and efficiently.

Additionally, because the table top may be constructed from blow-molded plastic with thin outer walls, this allows a table with reduced weight to be constructed. Significantly, the lightweight table can be easily transported, which decreases shipping costs. Additionally, the consumer may appreciate the reduced weight because they can much more easily move and/or assemble the table.

Another aspect a table top that may include one or more features that are integrally formed in the table top as part of a unitary, one-piece structure. Advantageously, this may reduce the number of steps required in the manufacturing process, which may reduce the overall cost of the table. For example, the depressions may be integrally formed in the table top during the manufacturing process. In addition, one or more mounting portions may be integrally formed in the table top to facilitate attachment of a frame and/or legs to the table top. The mounting portions may also allow the frame and/or legs to be attached to the table top without the use of mechanical fasteners such as bolts or screws.

Yet another aspect is a table top that may include one or more depressions located in a predetermined pattern to increase the strength of the table top and/or decrease the amount of plastic used to construct the table top. Advantageously, if the depressions are placed near each other, then the table top may be constructed with thinner outer surfaces or walls and the strength of the table top may be increased. Desirably, the locations of the depressions do not vary significantly even when other features are integrally formed in the table top. Thus, for example, the depressions are preferably positioned in close proximity and in the same general pattern even around features such as attachment points, edges and other features of the table top. In addition, one or more depressions may be formed within the various features to maintain the generally consistent pattern of depressions. Significantly, the generally uniform pattern of depressions may allow a table top with homogeneous characteristics to be constructed. Of course, the depressions could be positioned in any other suitable locations, designs, patterns, or the like.

Still another aspect is a table top that may include one or more corners with increased strength and/or impact resistance. In particular, the corners of the table top may be constructed to absorb a larger force or impact than a conventional table top. The corners of the table top may also be designed to resiliently and/or elastically deform when struck by another object and then return to its original configuration when the force is removed. Thus, the corners may provide greater impact protection for the table top and help prevent the corners or other portions of the table top from being damaged.

A still further aspect is a table top that may include a downwardly extending lip and the inner surface of the lip may include a number of serrations, notches, ribs, and/or struts that are sized and configured to increase the strength, rigidity and/or flexibility of the lip. Advantageously, the uneven inner surfaces of the lip may increase the strength, rigidity and/or flexibility of the table top. In addition, the corners of the table top may also include one or more serrations, notches, ribs, and/or struts that are sized and configured to increase the strength, rigidity and/or flexibility of the corners.

Advantageously, the table top may be relatively strong, durable and light-weight. In addition, the edges and corners of the table top may be impact resistant and able to absorb a relatively large force without damage. Preferably, the reinforcement portions that strengthen the corners and edges of the table top are located in the underneath or inner portions of the table top so that the reinforcement portions are generally not visible when the table is being used. It will be appreciated, however, that the reinforcement portions can be located in any desired portions of the table top. It will also be appreciated that the table top can be formed in various shapes, sizes, configurations and designs, which allows the table top to be used in connection with a wide variety of tables such as banquet tables, card tables, personal-sized tables, round tables, fold-in-half tables, and the like.

Another aspect is a table top that may be constructed from blow-molded plastic and include one or more reinforcement portions that help prevent damage to the edges and/or corners of the table top. The reinforcement portions may extend inwardly and/or outwardly and the reinforcement portions preferably have a generally elongated configuration such as rectangular, oval or oblong, but the reinforcement portions could have any desired configuration such as circular or square. In addition, the reinforcement portions may be formed in the underneath or lower portion of the table top and/or in a downwardly lip. Thus, the reinforcement portions may be generally horizontally or vertically positioned, if desired. Further, the reinforcement portions may be used to change the wall thickness. For example, the reinforcement portions may increase the wall thickness of the table top.

Advantageously, the reinforcement portions may be integrally formed in the table top as part of a one-piece structure. The reinforcement portions may also be found in one surface and all or a portion of the reinforcement portion may touch or contact an opposing surface, or the reinforcement portion may be spaced apart from the opposing surface. In addition, the edges and/or corners of the table top may include one or multiple reinforcement portions and the reinforcement portions may be arranged into a predetermined pattern. Significantly, the reinforcement portions may be arranged into different patterns for different portions of the table top. Further, the reinforcement portions may be used in connection with one or more depressions or tack-offs, if desired. For example, one or more depressions may be at least partially disposed within the reinforcement portions and/or one or more depressions may be spaced apart from the reinforcement portions.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limits its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

FIG. 13A is a bottom view of yet another exemplary embodiment of a table top;

FIG. 13B is a side view of the table top shown in FIG. 13A;

FIG. 13C is an end view of the table top shown in FIG. 13A;

FIG. 14A is a bottom view of still yet another exemplary embodiment of a table top;

FIG. 14B is a side view of the table top shown in FIG. 14A;

FIG. 14C is an end view of the table top shown in FIG. 14A;

FIG. 15A is a bottom view of a further exemplary embodiment of a table top;

FIG. 15B is a side view of the table top shown in FIG. 15A;

FIG. 15C is an end view of the table top shown in FIG. 15A;

FIG. 16A is a bottom view of another further exemplary embodiment of a table top;

FIG. 16B is a side view of the table top shown in FIG. 16A;

FIG. 16C is an end view of the table top shown in FIG. 16A;

DETAILED DESCRIPTION OF THE PREFERRED EMBODIMENTS

The present invention is generally directed towards structures constructed from blow-molded plastic. The principles of the present invention, however, are not limited to structures constructed from blow-molded plastic. It will be understood that, in light of the present disclosure, the structures disclosed herein can be successfully used in connection with other types of processes such as rotary molding, injection molding and the like.

As described in more detail below and as shown in the accompanying figures, an exemplary embodiment of the structure may be a table top constructed from blow-molded plastic. Advantageously, the table top may have a variety of suitable configurations and the table top may be used with a number of different types of tables. It will be appreciated that the structure does not have to be a table top and, in contrast, the structure could be any appropriate or desired type of structure.

Additionally, to assist in the description of the table top, words such as top, bottom, front, rear, right, and left are used to describe the accompanying figures. It will be appreciated, however, that the table top can be located in a variety of desired positions including various angles, sideways, and even upside down. A detailed description of the table top now follows.

Figure 1:
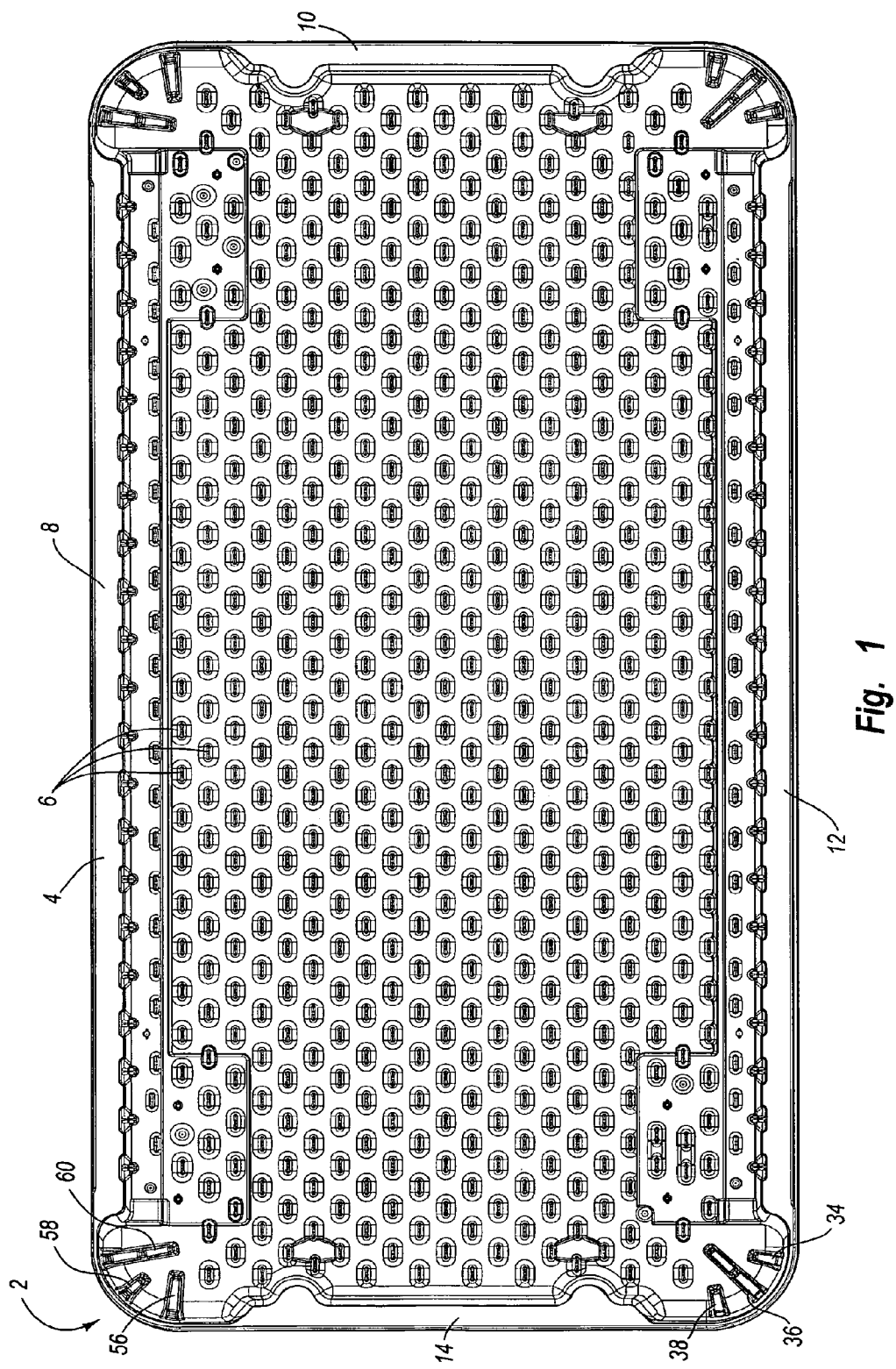
FIG. 1 is a bottom view of an exemplary structure illustrating a table top for a table, the table top preferably being constructed from blow-molded plastic.

As shown in FIG. 1, an exemplary embodiment of a table top 2 may be constructed from blow-molded plastic. Advantageously, as discussed in more detail below, the corners and/or edges of the table top 2 may be sized and configured to help protect the table top from damage. For example, the corners and/or edges may be sized and configured to help prevent damage to the table top 2 if the table top is dropped or struck during manufacturing, transportation or use of the table.

The table top 2 may be used in connection with a table that is supported above a surface by one or more legs or supports. The table top 2 may include an upper surface, a lower surface, a first end, a second end, a front side and a rear side. The upper surface of the table top 2 is preferably generally planar to create a smooth, flat working surface, but the upper surface could also be textured and have other suitable configurations depending, for example, upon the intended use of the table. The table top 2 may also include an edge that is disposed about the outer perimeter or periphery of the table top. All or a portion of the edge may be beveled, sloped or rounded to, for example, increase the comfort and safety of the user.

The table top 2 may also include a downwardly extending lip 4 that is disposed near or at the outer portion of the table top. The lip 4 preferably extends downwardly beyond the lower surface of the table top and the lip may be aligned with or form a part of the edge of the table top. If desired, the lip 4 may be formed along all or a portion of a perimeter of the table top. It will be appreciated that the lip 4 may also be spaced inwardly from the edge of the table top 2, if desired.

The table top 2 preferably has a generally rectangular configuration with rounded corners and slightly rounded edges, as shown in FIG. 1. The table top 2 may also have a relatively large size and it may be configured for use as a banquet style table. For example, if the table top 2 is being used as a banquet style table, it may have a length of about five feet (or about sixty inches) and a width of about two and one-half feet (or about thirty inches), but the table top can be larger or smaller. That is, the table top 2 could be six or eight feet in length, and the table top could be two or three feet in width. One skilled in the art will appreciate that the table top 2 can be larger or smaller according, for example, to the intended use of the table and the table top may be sized and configured to be used in connection with any suitable type of tables such as utility tables, conference tables, card tables, personal-sized tables, fold-in-half tables, and the like.

The table top 2 may also have other suitable shapes and configurations such as square, circular, oval, and the like depending, for example, upon the intended use of the table. Also, the corners and edges of the table top 2 do not have to be rounded and the corners and edges could have other desirable configurations.

The table top 2 is preferably constructed from plastic, such as high density polyethylene, and the table top is preferably constructed by a blow-molding process because, for example, it allows a strong, lightweight, rigid and sturdy table top to be quickly and easily manufactured. Advantageously, the blow-molded plastic table top is relatively lightweight and it may include a hollow interior portion. The hollow interior portion, however, may be filled with a material, such as foam, if desired.

The table top 2 is preferably constructed from blow-molded plastic because blow-molded plastic table tops are relatively durable, weather resistant, temperature insensitive, corrosion resistant, rust resistant, and blow-molded plastic generally does not deteriorate over time. One skilled in the art, however, will appreciate that the table top 2 does not have to be constructed from blow-molded plastic and other suitable materials could be used to construct the table top—such as other types of plastics, polymers and synthetic materials. In addition, the table top 2 may be constructed from other materials with suitable characteristics such as metal, fiberglass, ceramics, graphite and the like.

The upper surface and the lower surface of the table top 2 are preferably spaced apart a given distance and these two spaced-apart surfaces may help create a rigid and strong table top. Preferably, the upper surface and the lower surface are separated by a generally constant distance so that the surfaces are generally aligned in parallel planes, but the upper and lower surfaces could be separated by any suitable distances. The upper and lower surfaces of the table top may also be interconnected by one or more tack-offs, kiss-offs or depressions 6, which may be sized and configured to further increase the strength and rigidity of the table top. Advantageously, the depressions 6 may be integrally formed as part of a unitary, one-piece table top 2.

The depressions 6 may be located in the lower surface of table top 2, and the depressions are preferably sized and configured to increase the strength and structural integrity of the table top. The depressions 6 preferably extend towards the upper surface of the table top 2, and the ends of the depressions may contact or engage the upper surface of the table top, or the ends of the depressions may be spaced from the upper surface of the table top. The depressions 6 may cover substantially the entire lower surface of the table top 2, but it will be appreciated that the depressions may cover only a portion of the table top.

Additionally, while the depressions 6 are shown and described as being located in the lower portion of the table top 2, it will be appreciated that the depressions could be formed in any desired portion of the table top. For example, it will be appreciated that one or more depressions may be formed in the upper surface of the table top and one or more depressions may be formed in the lower surface of the table top, and these opposing depressions may be generally aligned. At least a portion of these opposing depressions may contact or engage each other, but the opposing depressions do not have to touch or engage.

The depressions 6 may be preferably arranged into a predetermined pattern or array in order to increase the strength and structural integrity of the table top 2. In particular, the depressions 6 may be preferably spaced closely together in a predetermined pattern such that the distance between the depressions is reduced. Advantageously, reducing the distance between the depressions 6 create a table top 2 with generally uniform characteristics and it may increase the smoothness of the upper surface of the table top. In addition, reducing the distance between the depressions 6 may increase the structural integrity and strength of the table top 2.

Advantageously, the increased structural integrity and strength of the table top 2 may allow the outer wall thickness of the table top to be decreased, which may allow less plastic to be used to construct the table top 2. Because less plastic may be required to construct the table top 2, that may allow the cost of the table to be decreased. In addition, the blow-molded table top 2 may cool more quickly during the manufacturing process because of the thinner outer wall. This allows the table top 2 to be removed from the manufacturing mold more quickly and it may allow the table top to be removed at a higher temperature because it dissipates heat much more rapidly. Significantly, because the cycle time required to construct the table top may be decreased, the manufacturing efficiency may be increased.

The depressions 6 may be arranged in a predetermined pattern with a generally constant and uniform spacing so that the table top 2 has generally uniform characteristics. In particular, the depressions 6 may be arranged into a uniform pattern across the bottom surface of the table top 2 so that the strength, structural integrity and/or other characteristics of the table top are generally uniform throughout the table top. Thus, the table top 2 has fewer, if any, weak or unsupported portions which may decrease the strength and structural integrity of the table top. Thus, the depressions 6 may be used to create a table top 2 with generally uniform characteristics throughout the table top. Of course, depressions 6 need not be arranged in any particular pattern or predetermined arrangement.

If desired, other features formed in the table top 2 may be sized and configured such that they do not significantly disturb or disrupt the desired pattern of depressions 6. In addition, the depressions 6 may be integrally formed in the table top as part of a unitary, one-piece structure.

Additional details regarding the size, shape, and configuration of depressions 6 that may be suitable for use in connection with the table top 2 are disclosed in U.S. Pat. No. 7,069,865, which is incorporated by reference in its entirety. Of course, the depressions 6 may have other suitable sizes, shapes, and/or configurations and the depressions can be disposed in any desired portion on a table top 2, but the depressions are not required.

As discussed above, the table top 2 may include a lip 4 that extends downwardly and the lip may be aligned with or form part of the edge of the table top. The lip 4 may also be spaced inwardly from the edge of the table top 2 and the lip 4 may include an inner surface and a lower surface. The lip 4 may include a substantially hollow interior portion that is formed during the blow-molding process as part of an integral, one-piece structure. The lip 4, however, does not have to be part of a unitary table top 2, include a hollow interior portion or be formed during the blow-molding process. The lip 4 desirably includes a generally smooth and/or planar surface (such as, surfaces 8, 10, 12, and 14 shown in FIG. 1) to facilitate stacking of the tables. However, the lip 4 could have any other suitable shapes and configurations.

The table top 2 may also include one or more corners depending, for example, upon the particular configuration of the table top. For example, as shown in FIG. 1, the table top 2 includes four corners that are generally aligned with the edges of the table top, but the corners do not have to be aligned with the edges of the table top. The corners may include an inner surface, a lower surface and a substantially hollow interior portion that is formed during the blow-molding process as part of an integral, one-piece structure. The corners, however, do not have to be part of a unitary table top 2, include a hollow interior portion or be formed during the blow-molding process. The lower surfaces of the corners may be generally smooth and/or planar to facilitate stacking of the tables, but the corners could have other suitable shapes or configurations.

Advantageously, the lip 4 and/or the corners may include one or more reinforcement portions that are sized and configured to increase the strength, rigidity and/or flexibility of the lip and/or corners. For example, the lip 4 and/or corners may include reinforcement portions that consist of a number of serrations, notches, ribs, and/or struts. In particular, the lip 4 and/or corners may include a number of notches, indentations, grooves, or other inwardly extending portions to form an uneven or saw-tooth type surface. The lip 4 and/or corners may also include a number of bumps, humps, protrusions or other outwardly extending portions to form an uneven or saw-tooth type surface. If desired, the lip 4 and/or corners may include a combination of one or more inwardly extending portions and one or more outwardly extending portions to form an uneven or saw-tooth type surface.

Advantageously, the reinforcement portions of the lip 4 and/or corners may increase the strength, rigidity and/or flexibility of the corners and/or lip—which may increase the strength, rigidity and/or flexibility of the outer portions of the table top 2. For example, the reinforcement portions may allow the outer portions of the table top to absorb more energy or larger impacts than the corners and lip of conventional tables. Additionally, the reinforcement portions may allow the lip and/or corners to absorb more energy without deforming, and the lip and/or corners may flex or deflect more without breaking or permanently deforming. Further, the reinforcement portions may allow the lip and/or corners to be more likely to resiliently return to there original configurations. Thus, the reinforcement portions may create a more durable and longer-lasting table top 2.

The reinforcement portions may also include one or more ribs that may increase the wall thickness of the corners and/or the lip. Advantageously, the ribs may also increase the strength, rigidity, and/or flexibility of the outer portions of the table top. The ribs may extend from the lower surface of the table top to the lower surface of the corners and/or lip, and the ribs are preferably generally vertically aligned. However, the ribs may have any other suitable arrangement and configuration.

It will be appreciated that the reinforcement portions may include one or more ribs, inwardly extending portions and/or the outwardly extending portions. Further, it will be appreciated that the inwardly extending portions, the outwardly extending portions, and/or the ribs may be located in various suitable portions of the table top 2, such as the outer surfaces of the lip 4, the edge of the table top and/or the lower surface of the corners and/or the lip. It will be understood, however, that a table top 2 does not require that the reinforcement portions be formed in any particular portions of the table top.

Advantageously, the reinforcement portions may be sized and configured to work in connection with the depressions 6. For example, the reinforcement portions may be positioned such that they are generally consistent with the depressions 6 formed in the table top. For example, the reinforcement portions may be located so that they are aligned with the pattern of depressions 6 to create a table top with more uniform characteristics. This may allow a table top 2 to be constructed with generally consistent strength and structural integrity. For example, one or more depressions 6 may be formed in the lower surface of the table top 2 and may extend towards and/or contact the upper surface of the table top. Also, one or more depressions 6 may be formed in the inner surface of the corner and may extend towards and/or contact the outer surface of the corner. Thus, if desired, one or more depressions 6 may be formed in the inner surface of a corner, the lower surface of the table top, or both. Advantageously, the corners of the table top 2 may have the same design or configuration, but the corners may have a different design or configuration depending, for example, upon the intended use of the table top. Of course, the reinforcement portions need not be generally consistent with the depressions 6.

Further, if desired, the reinforcement portions may be spaced closer together in the corners than along the edges to further increase the strength and structural integrity of the table top 2. The reinforcement portions may be particularly advantageous in the corners because the corners may be more likely to be damaged since the corners may have less strength than the edges of a table top.

In order to increase the strength and structural integrity of the corners, the radius of the corners may be increased because the strength and structural integrity of the corners may increase with a larger radius of curvature. Preferably, the radius of curvature of the inner surface of the corner is increased and one or more reinforcement portions are formed in the corner for added strength. It will be appreciated that reinforcement portions may also be formed on the outer surfaces of the corners or other portions of the table top.

Advantageously, the reinforcement portions may be integrally formed in the table top 2 as part of a unitary, one-piece structure and these features may be formed during the blow-molding process. Because these features may be integrally formed in the table top, that may expedite the manufacturing process and may provide a more strong and/or resilient table top. These features, however, do not have to be integrally formed in the table top and they could be attached to the table top by any suitable methods or devices.

Figure 2:
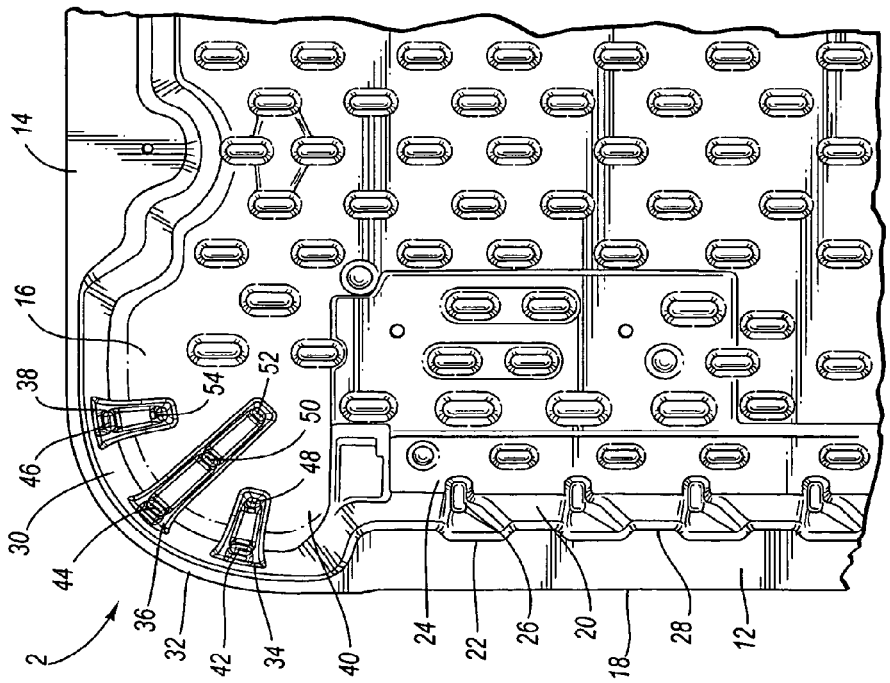
FIG. 2 is an enlarged, bottom view of a portion of the table top shown in FIG. 1.

As shown in FIG. 2, the lip 4 extends downwardly beyond the lower surface 16 of the table top 2 and the lip is aligned with or forms part of the edge 18 of the table top 2. It will be appreciated that the lip 4 may also be spaced inwardly from the edge 18 of the table top 2, if desired.

The lip 4 also includes an inner surface 20 with one or more reinforcement portions that may be sized and configured to increase the strength, rigidity, and/or flexibility of the lip. The reinforcement portions may include an inwardly extending portion, such as a channel, that has a generally tapered or otherwise narrowing shape. For example, the channel may have a width of about 0.8 inches proximate to or at a lower surface of the lip that tapers or otherwise narrows to a width of about 0.3 inches proximate to or at a lower surface of the table top. Accordingly, the channel may taper to about thirty percent to about fifty percent of its original width, but the channel could have a larger or smaller taper. Of course, the channel need not be tapered and it could have any other suitable sizes, shapes and configurations depending, for example, upon the intended purpose of the table top. As illustrated in FIG. 2, one or more depressions may be disposed within the reinforcing portions. For example, a plurality of depressions 26 may be disposed within the channel 22 and in the lower surface 24 of the table top 2. Of course the depressions 26 may be disposed in other suitable locations.

As shown in FIG. 2, the inner surface 20 of the lip 4 may include reinforcement portions with one or more outwardly extending portions 28 that are sized and configured to increase the strength, rigidity and/or flexibility of the lip 4. If desired, the reinforcement portions may include one or more ribs, which may increase the wall thickness and increase the strength, rigidity and/or flexibility of the lip 4.

As shown in FIG. 2, the table top 2 may include a corner with an inner surface 30 and a lower surface 32. As shown, one or more reinforcement portions, such as inwardly extending grooves or channels 34, 36 and 38 may at least partially be disposed within the inner surface 30 of the corner. If desired, the inwardly extending portions could be at least partially disposed within the inner surface 30 and/or the lower surface 32. Also, if desired, the inwardly extending portions may have a generally tapered or otherwise narrowing shape. For example, the channels 34, 36 and 38 may have a width of about 0.6 inches at an end of the channel proximate to or at the inner surface 30 of the corner that tapers or otherwise narrows to a width of about 0.3 inches at an end of the channel proximate to or at the surface 40 of the table top 2. Accordingly, the channel may taper to about forty percent to about sixty percent of its width, but the channel could be tapered any suitable amount. Of course, the channel need not be tapered and could have any other suitable size, shape, or configuration depending, for example, upon the size and/or configuration of the table top 2.

As shown in FIG. 2, the lip 4 and/or corners may include a plurality of reinforcing portions including two outer reinforcing portions having a first length, such as the channels 34 and 38, and a center reinforcing portion having a different length, such as the channel 36. For example, the channels 34 and 38 have a length of about 1.5 inches along the lower surface of the table top 2, and the channel 36 has a length of about 2.5 inches along the lower surface of the table top 2. Accordingly, the outer reinforcing portions may have a length along the lower surface of the table top 2 that is about fifty percent to about seventy percent of the length of the inner reinforcing portion. Of course, the reinforcing portions may have other dimensions, and the reinforcing portions may have the same or different dimensions.

As shown in FIG. 2, one or more depressions may be at least partially disposed within one or more reinforcing portions formed in the inner surface 30 of the corner and/or in the lower surface 16 of the table top 2. For example, as shown in FIG. 2, all or at least a portion of the depressions 42 and 48 may be disposed within the channel 34; all or at least a portion of the depressions 44, 50 and 52 may be disposed within the channel 36; and all or at least a portion of the depressions 46 and 54 may be disposed within the channel 38. One or more of the depressions that are at least partially formed on the inner surface 30 of the corner, such as depressions 42, 44 and 46, may at least partially extend toward and contact or otherwise engage an opposing surface, such as the outer edge 18 of the table top 2. Also, one or more depressions of the depressions that are at least partially formed on the lower surface 16 of the table top 2, such as depressions 48, 50, 52 and 54, may at least partially extend toward and contact or otherwise engage an opposing surface, such as an upper surface of the table top 2. If desired, more or fewer depressions may be formed in the channels 34, 36, and 38, but the depressions need not be formed in any channel and may be spaced apart from the channels.

One or more reinforcing portions may be formed on an inner surface of a corner, an inner surface of a lip, and/or a lower surface of a table top and may also be positioned such that they are generally consistent with or otherwise generally aligned with one or more depressions. For example, as shown in FIG. 2, the channel 34 is generally aligned with the depression 42 and the depression 48. Also, the channel 36 is generally aligned with the depression 44, the depression 50, and the depression 52; and the channel 38 is generally aligned with the depression 46 and the depression 54. Of course, the reinforcing portions do not have to be generally consistent with or otherwise generally aligned with any depressions.

As shown in FIG. 2, the distance between an inner surface and an outer surface of a corner may be generally less than the distance between an inner surface and an outer surface of a portion of the lip 4 proximate a side of the table top 2. For example, a portion of the lip 4 proximate a corner may be generally thinner than a portion of the lip proximate a side of the table top 2 and spaced from the corner, and the opposing portions 8 and 12 and the opposing portions 10 and 14 are generally thicker than the corners. Advantageously, the generally thinner corner may provide a more strong, flexible and/or resilient corner. In one embodiment, a portion of the lip 4 proximate a corner may be about 0.25 inches thick, an outwardly extending portion 28 may be about 1.3 inches thick, and an inwardly extending portion 22 may be about 1 inch thick. In one embodiment, the average distance between an inner surface and an outer surface of a corner may be about 20 percent to about 30 percent of the average distance between an inner surface and an outer surface of the lip 4 proximate a side of the table top 2. It will be appreciated that corners and/or portions of the lip 4 may have any other suitable dimensions or attributes. Further, corners and/or portions of the lip 4 may have the same or different thicknesses, shapes, and/or configurations as each other.

Figure 3:
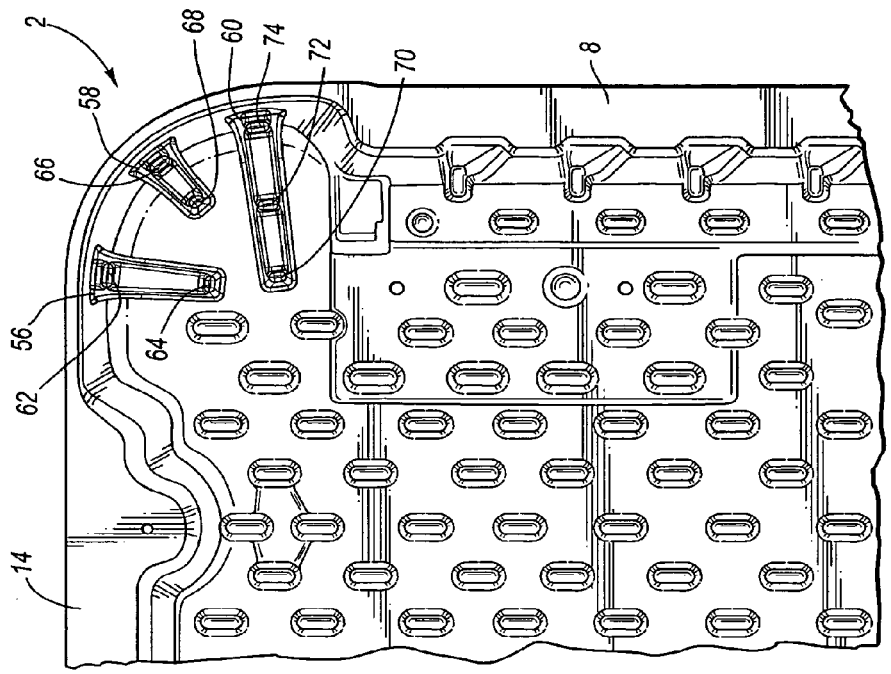
FIG. 3 is an enlarged, bottom view of another portion of the table top shown in FIG. 1.

As shown in FIG. 3, one or more reinforcing portions, such as channels 56, 58, and 60, may be formed on an inner surface of a corner, an inner surface of a lip, and/or a lower surface of a table top; and some or all of the reinforcing portions may have the same or different lengths. For example, the channel 56 may have a length of about 1.5 inches along the lower surface of the table top 2, the channel 58 may have a length of about 1 inch along the lower surface of the table top 2, and the channel 60 may have a length of about 2.5 inches along the lower surface of the table top 2. Thus, a center reinforcing portion may be shorter than two outer reinforcing portions, and one reinforcing portion may be shorter than the other outer channel reinforcing portion. For example, the outer channel 56 may have a length along the lower surface of the table top 2 that is about fifty-five percent to sixty-five percent of the length of the outer channel 60 along the lower surface of the table top 2, and the center channel 58 may have a length along the lower surface of the table top 2 that is about forty-five percent to fifty-five percent of the length of the outer channel 60 along the lower surface of the table top 2. Also, one or more depressions may be at least partially disposed within the channels 56, 58, and 60. For example, as shown in FIG. 3, all or at least a portion of depressions 62 and 64 may be disposed within the channel 56; all or at least a portion of depressions 66 and 68 may be disposed within the channel 58; and all or at least a portion of depressions 70, 72, and 74 may be disposed within the channel 60. It will be appreciated that the channels 56, 58, and 60 may have larger or smaller dimensions, and more, fewer, or no depressions may be disposed within the channels.

Figure 4:
FIG. 4 is a side view of the table top shown in FIG. 1.
Figure 5:
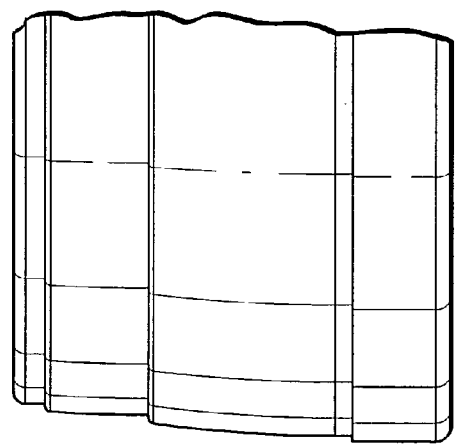
FIG. 5 is an enlarged side view of a portion of the table top shown in FIG. 1.

As shown in FIGS. 4 and 5, the lip 4 and corners of the table top 2 are preferably generally perpendicular to the upper surface of the table top, and the outer surfaces of the lip 4 and the corners of the table top 2 include one or more ridges, steps, edges, and the like. However, the outer surfaces of the lip 4 and the corners may have any other suitable shape and/or configuration.

Figures 6, 7:
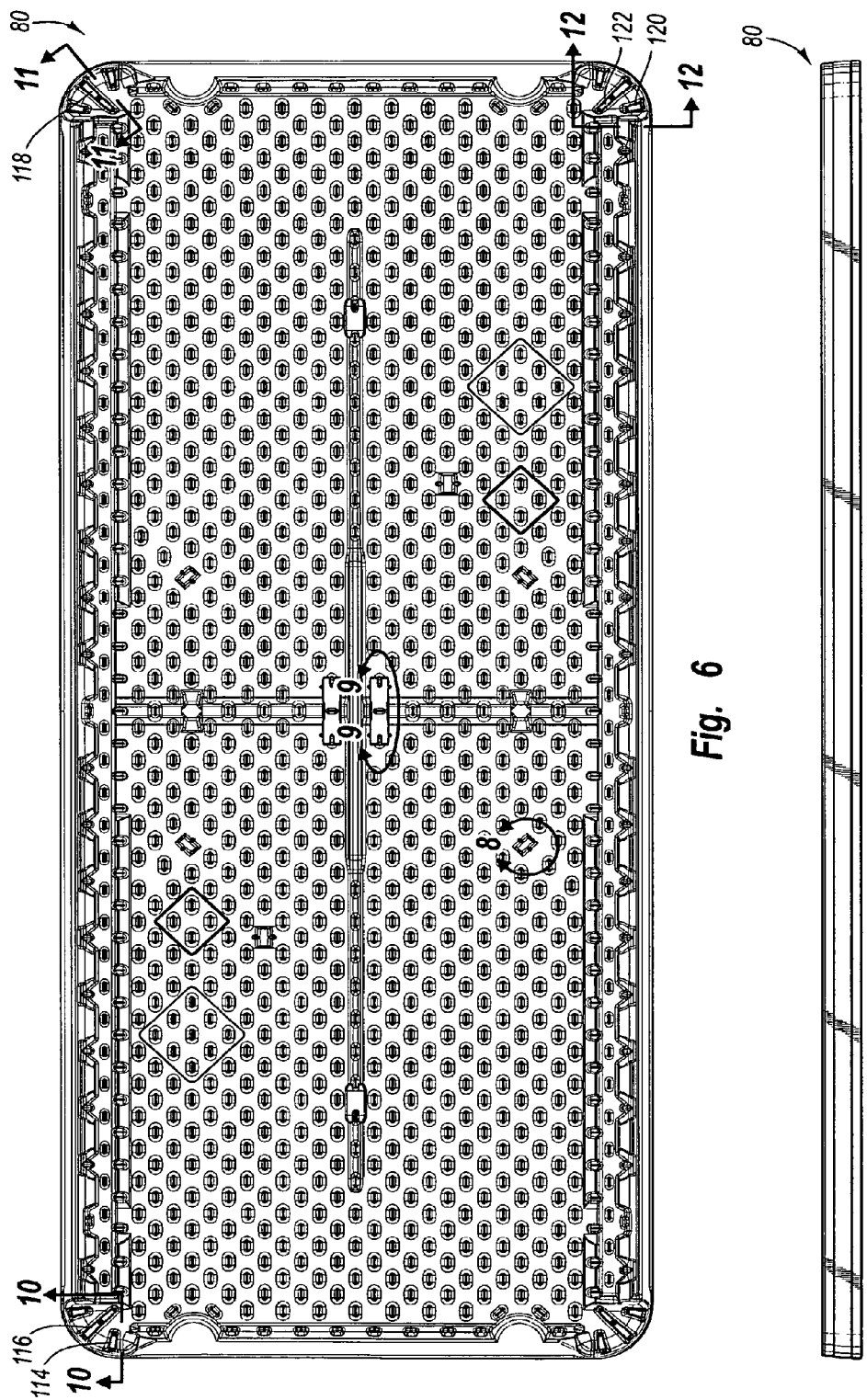
FIG. 6 is a bottom view of another exemplary embodiment of a table top.
FIG. 7 is a side view of the table top shown in FIG. 6.
Figure 8:
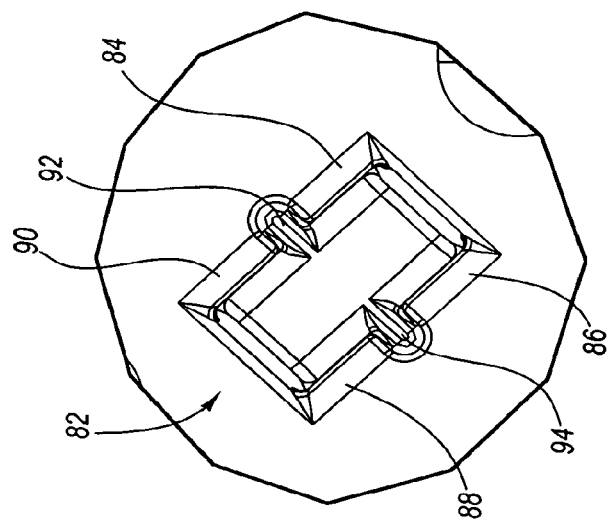
FIG. 8 is an enlarged bottom view of a portion of the table top shown in FIG. 6.

As shown in FIGS. 6 and 8, an attachment assembly 82 may be integrally formed in a lower surface of a table top 80 as part of a unitary, one-piece structure using, for example a blow-molding process. The attachment assembly 82 may be advantageously sized and configured to securely receive a clip, a post, a portion of a table frame, or the like using a snap fit, an interference fit, a friction fit, or the like. For example, the attachment assembly 82 may include one or more engagement members, such as engagement members 84, 86, 88 and 90, sized and configured to resiliently deform or otherwise move to securely receive a clip, a post, a portion of a table frame, or the like. The attachment assembly 82 preferably includes one or more depressions, which may contact, engage, and/or be disposed proximate to the engagement members 84, 86, 88 and 90. In one embodiment, the attachment assembly 82 may include a pair of depressions 92 and 94 that are proximate opposing sides of the attachment assembly 82 and are generally aligned. Advantageously, one or more pairs of depressions may be sized and configured to provide stability along at least one axis of the attachment assembly 82, to strengthen the table top 80, and to reduce damage to the table top 80 when attaching and/or detaching a clip, a post, a portion of a table frame, or the like to the attachment assembly 82.

Figure 9:
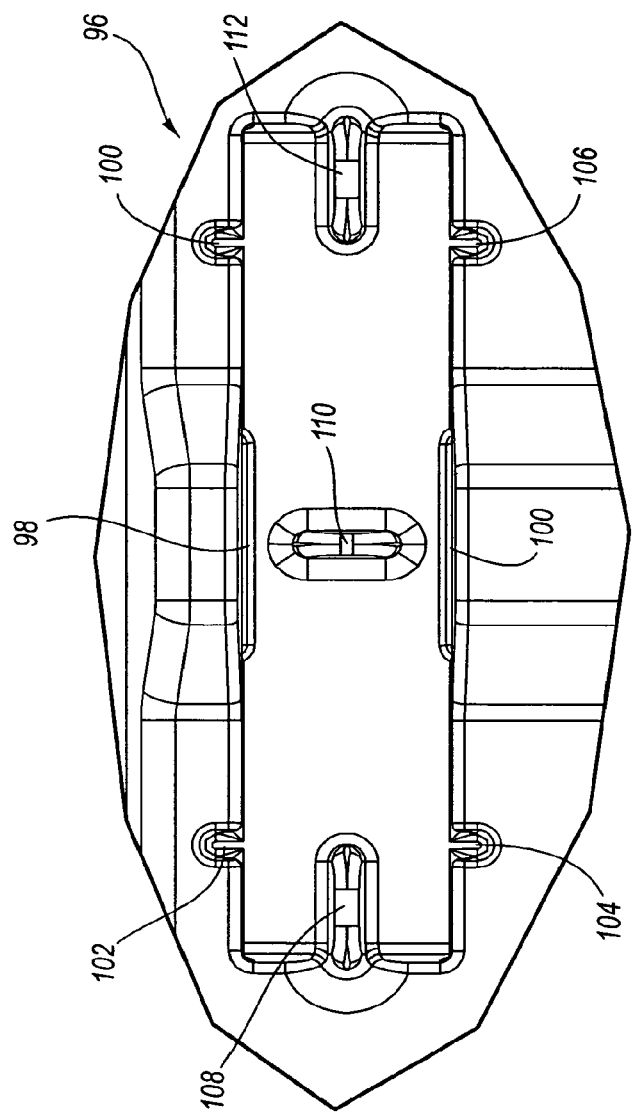
FIG. 9 is an enlarged bottom view of another portion of the table top shown in FIG. 6.

As shown in FIGS. 6 and 9, another attachment assembly 96 may be integrally formed in a lower surface of the table top 80 as part of a unitary, one-piece structure using, for example a blow-molding process. The attachment assembly 96 may be advantageously sized and configured to securely receive a clip, a post, a portion of a table frame, or the like using a snap fit, an interference fit, a friction fit, or the like. The attachment assembly 96 may include one or more engagement members 98 and 100 sized and configured to deform or otherwise move to securely receive a clip, a post, a portion of a table frame, or the like. The attachment assembly 96 preferably includes depressions 100, 102, 104, 106, 108, 110, and 112, which may contact, engage, and/or be disposed proximate to the engagement members 98 and 100. The attachment assembly 96 may include one or more pairs of depressions that are proximate opposing sides of the attachment assembly 96 and generally aligned. Advantageously, one or more pairs of depressions may be sized and configured to provide stability along one axis, and one or more pairs of depressions may be sized and configured to provide stability along a second axis, generally perpendicular to the first axis. Also, one or more depressions, such as the depression 110, may be disposed proximate the center of the attachment assembly 96. Also, the depressions may be advantageously sized and configured to strengthen the table top 80, and to reduce damage to the table top 80 when attaching and/or detaching a clip, a post, a portion of a table frame, or the like to the attachment assembly 96.

As illustrated in FIGS. 8 and 9, the attachment assemblies 82 and 96 may help the table top 80 to be quickly and easily attached to and/or detached from a clip, a post, a portion of a table frame, or the like. As shown, the attachment assemblies 82 and 96 may include one or more depressions, which may extend toward and/or contact or otherwise engage an opposing surface, such as the upper surface of the table top 80. The depressions need not contact or otherwise engage an opposing surface and may be spaced from an opposing surface.

As shown in FIG. 6, some or all of the corners of a table top (such as, the table top 80 in FIG. 6) may have the same or different designs and/or configurations. For example, the corners may include three channels with two outer channels that are about the same length and an inner channel that is longer than the outer channels. The outer channels may include a plurality of depressions that are formed in the bottom surface of the channels with one depression being formed adjacent or proximate the inner surface of the corner and another depression being formed away from the inner surface of the corner and/or at or near the other end of the channel. The inner channel may include a plurality of depressions, including one depression formed adjacent or proximate the inner surface of the corner, another depression formed near the middle of the channel, and another depression formed away from the inner surface of the corner and/or at or near the other end of the channel. One skilled in the art will appreciate that the corners may include any suitable other combination of channels and depressions in any desired configuration.

As shown in FIGS. 6, 10, 11 and 12, the channels 114, 116, 118, 120, and 122 may extend generally from the lower surface of the table top to the upper surface of the table top, but the channels preferably do not touch or contact the upper surface of the table top. Of course, all or at least a portion of the channels 114, 116, 118, 120, and 122 could touch or contact the upper surface of the table top 80, if desired. One or more depressions, such as depressions 124, 126, 128, 130, 132, and 134, may be formed in the channels 114, 116, 118, 120, and 122. The depressions 124, 126, 128, 130, 132, and 134 may contact or engage the inner portion of the upper surface of the table top, or the depressions 124, 126, 128, 130, 132, and 134 may be spaced apart from the inner portion of the upper surface of the table top. In addition, the depressions 136, 138, and 140 may be sized and configured to extend towards the outer surface or wall of the corner and/or to contact or engage the inner portion of the outer surface or wall of the corner; but the depressions 136, 138, and 140 may be spaced apart from the inner portion of the outer surface or wall of the corner. Of course, if desired, these depressions may at least partially contact, engage, and/or extend toward both of--or neither of--the upper surface of the table top and the outer surface or wall of the corner. Further, these depressions may be spaced apart from both of—or neither of—the upper surface of the table top and the outer surface or wall of the corner.

Advantageously, the reinforcing portions and/or depressions formed in the lip and/or the corners of table tops, such as the table tops 2 and 80, may increase the strength and/or impact resistance of the corner. For example, the side walls and lower surfaces of the channels may help increase the strength and/or impact resistance of the corner. The side walls and lower surfaces of the depressions may also help increase the strength and/or impact resistance of the corner. The reinforcing portions and/or depressions may also facilitate the corners of the table top absorbing a larger amount of force or impacts. Significantly, this may help prevent the table top from being damaged if it is dropped or accidentally struck with another object. The reinforcing portions and/or depressions may also increase the resiliency of the table top. In particular, if a force is applied to a corner of the table top, a portion of the corner may deform or bend and, once the force is removed, the corner may return to its original configuration. Thus, the table top may be able to absorb a larger force because the corner may be flexible and elastically deform when a force is applied and then mechanically return to its original position. Thus, the reinforcing portions and/or depressions may help prevent damage to the corners of the table top. Significantly, because a table top may be difficult to repair or replace, the stronger corners may provide a considerably improved table top.

Figure 11:
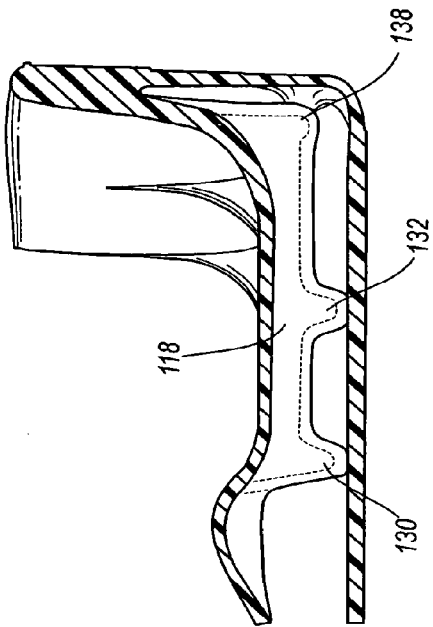
FIG. 11 is an enlarged cross-sectional side view of another portion of the table top shown in FIG. 6.
Figure 12:
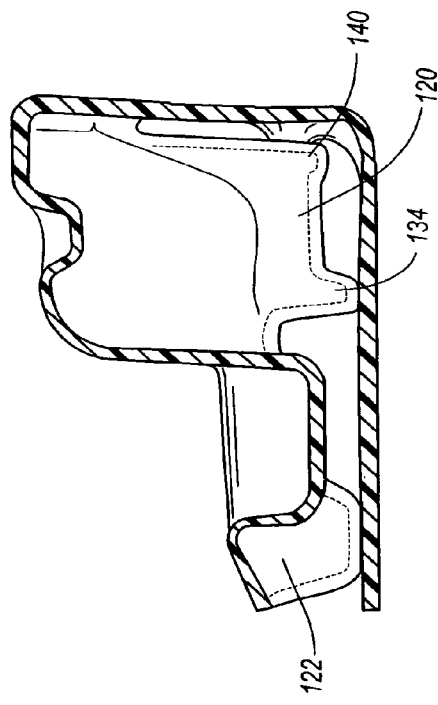
FIG. 12 is an enlarged cross-sectional side view of still another portion of the table top shown in FIG. 6.
Figure 10:
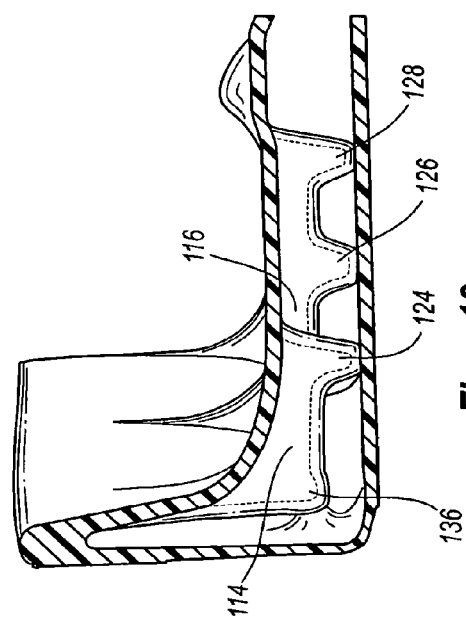
FIG. 10 is an enlarged cross-sectional side view of another portion of the table top shown in FIG. 6.

As shown in FIGS. 6 and 10-11, the table top 80 may include a lip that may include an interior wall or portion, a spaced apart exterior wall or portion and a hollow portion that may be at least partially disposed between the interior and exterior portions. In addition, as shown in FIGS. 10-11, the lip may include a protrusion, which may have an at least substantially solid construction and may be disposed adjacent the interior portion, the exterior portion and/or the hollow portion of the lip. As shown in FIG. 6, the interior portion, the exterior portion, the hollow portion and the substantially solid protrusion may form part of a corner of the table top 80. As shown in FIGS. 10-11, the table top 80 may also include an upper wall or portion and a spaced apart lower wall or portion and a hollow portion that may be at least partially disposed between the upper and lower portions. As shown in FIG. 10-11, the upper portion, the lower portion, the interior portion, the exterior portion, the hollow portions and/or the substantially solid protrusion may be integrally formed as part of a unitary, one-piece structure using, for example, the blow-molding process discussed above.

The thickness of the substantially solid protrusion may be significantly larger than the thickness of the interior portion of the lip, the thickness of the exterior portion of the lip, the thickness of the upper portion of the table top and/or the thickness of the lower portion of the table top. For example, as shown in FIGS. 10-11, the thickness of the substantially solid protrusion may be at least about two times the thickness of the interior portion of the lip; at least about two times the thickness of the exterior portion of the lip; at least about two times the thickness of the upper portion of the table top; and/or at least about two times the thickness of the lower portion of the table top. Also, as shown in FIGS. 10-11, the thickness of the substantially solid protrusion may be at least about the combined thicknesses of the interior and exterior portions of the lip and/or at least about the combined thicknesses of the upper and lower portions of the table top.

In addition, the height of the substantially solid protrusion may be significantly larger than the thickness of the interior portion of the lip, the thickness of the exterior portion of the lip, the thickness of the upper portion of the table top and/or the thickness of the lower portion of the table top. For example, as shown in FIGS. 10-11, the height of the substantially solid protrusion may be at least about two or three times the thickness of the interior portion of the lip; at least about two or three times the thickness of the exterior portion of the lip; at least about two or three times the thickness of the upper portion of the table top; and/or at least about two or three times the thickness of the lower portion of the table top. Also, as shown in FIGS. 10-11, the height of the substantially solid protrusion may be at least about the combined thicknesses of the interior and exterior portions of the lip and/or at least about the combined thicknesses of the upper and lower portions of the table top.

Applicants have conducted impact tests on table tops constructed with reinforcing portions and depressions, such as those described above. The tests determined that table tops dropped on a corner with the reinforcing portions and depressions was not damaged or had minimal damage when dropped from a height of thirty inches. In particular, the corner was not damaged at all or the corner was deformed but it self-recovered so that there was no or minimal damage. In contrast, conventional table tops constructed from blow-molded plastic were typically damaged from dropped from a height of eighteen inches. Thus, the reinforcing portions and/or depressions provided a significant increase in strength and/or impact resistance for the corner of a table top.

As shown in FIG. 13A-13C, a table top 150 may include a lip having end portions 152 and 154, which may join two corners. The end portions 153 and 154 have substantially the same thickness as the corners that the end portions join, which thickness is substantially thinner than one or more other portions of the table top 180, such as the portions 156 and the portions 158. It will be appreciated that the various portions of the lip of the table top 150 may have any other dimensions, including the same dimensions or different dimensions, if desired.

The table top 150 includes a reinforcing portion comprising a ridge or raised portion 160, which may be disposed along all or a portion of one or more corners and/or along all or a portion of the end portion 154 of the table top 150. The table top 150 also includes a pair of reinforcing portions comprising channels 162 and 164. The channel 162 includes a plurality of depressions, including a two depressions spaced apart from the inner surface of the corner and a depression disposed proximate the inner surface of the corner. The channel 164 includes a plurality of depressions, including five depressions spaced apart from the inner surface of the corner and a depression disposed proximate the inner surface of the corner.

As shown in FIGS. 14A-14C, a table top 170 may include a reinforcing member comprising a channel or groove 172, which may be disposed along all or a portion of the length of one or more corners and/or along all or a portion of the length of an end portion 174. Also, a plurality of depressions 176 may be at least partially disposed within the channel 172. As shown in FIGS. 14A-14C, the table top 170 may also include the reinforcing portion 178, which illustrates that the reinforcing portions need not have any portion of a depression disposed within the reinforcing portions.

As shown in FIGS. 15A-15C, a table top 190 may include a reinforcing member comprising a ridge or raised portion 192, which may be disposed along all or a portion of the length of one or more corners and/or along all or a portion of the length of an end portion end portion 194. The ridge 192 may be disposed along less than half of the end portion 194, if desired. One or more depressions 196 may be disposed within, contact, or otherwise intersect at least a portion of the ridge 192. The table top 190 may also include a reinforcing member comprising a channel 198, which may be disposed proximate to and/or along all or a portion of one or more corners and/or may be disposed proximate to and/or along all or a portion of an end portion. One or more depressions 200, 202 and 204 may be disposed within, contact, or otherwise intersect at least a portion of the channel 198.

Figure 16D:
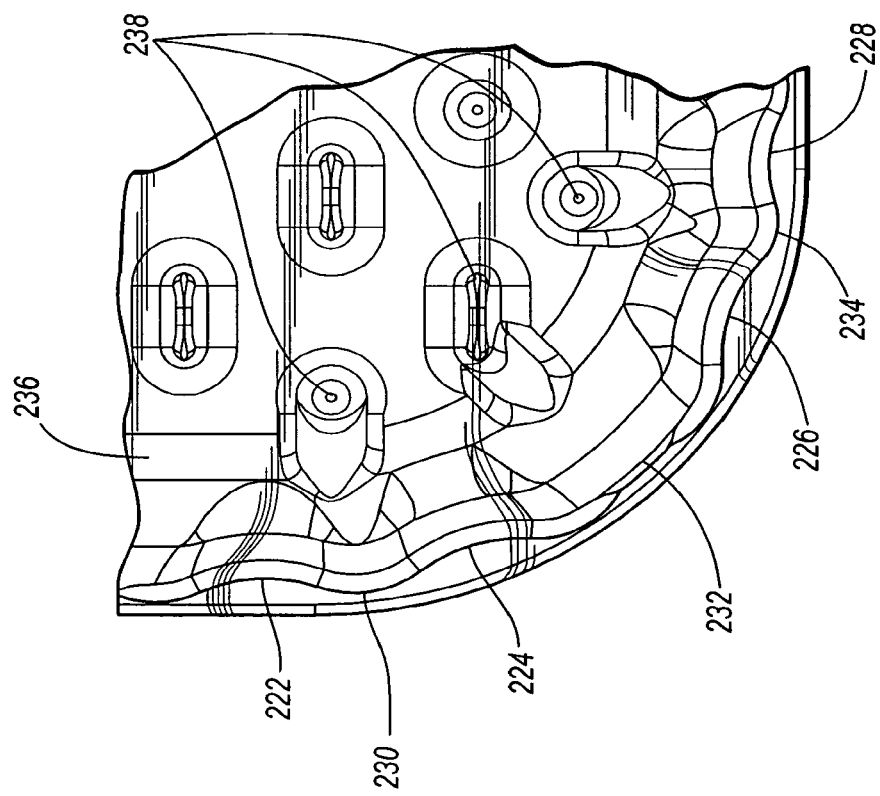
FIG. 16D is an enlarged bottom view of a portion of the table top shown in FIG. 16A.

As shown in FIG. 16D, a corner of the table top 220 may include one or more reinforcing portions comprising one or more outwardly extending portions 222, 224, 226, and 228 and/or one or more inwardly extending portions 230, 232, and 234. The outwardly extending portions 224 and 226 may have a thickness of about 0.5 inches proximate their respective centers and the outwardly extending portions 222 and 228 may have a thickness of about 0.45 inches proximate their respective centers. Thus, the corner of the table top 220 may include one or more outwardly extending portions positioned proximate the center of the corner and may include one or more outwardly extending portions spaced apart from the center of the corner, and the outwardly extending portions positioned proximate the center of the corner may be thicker than the outwardly extending portions spaced apart from the center of the corner. Also, the inwardly extending portion 232 may have a thickness of about 0.3 inches proximate its center, and the inwardly extending portions 230 and 234 may have a thickness of about 0.4 inches proximate their respective centers. Thus, the corner of a table top 220 may include one or more inwardly extending portions positioned proximate the center of the corner and may include one or more inwardly extending portions spaced apart from the center of the corner, and the inwardly extending portions positioned proximate the center of the corner may be thinner than the inwardly extending portions spaced apart from the center of the corner. Of course, the inwardly and/or outwardly extending portions of the corner shown in FIG. 16D may be disposed in any other suitable location and may have any other suitable dimensions or relative sizes.

As shown in FIG. 16D, the one or more of the outwardly extending portions 222, 224, 226, and 228 may contact, engage, abut, or otherwise be disposed proximate to a channel or groove 236 disposed proximate the intersection of the lower surface of the table and the inner surface of the corner. Also, one or more of the inwardly extending portions 230, 232, and 234 may be spaced apart from the channel 236. Also, one or more depressions 238 at least partially formed on a lower surface of the table top 220 may contact, engage, abut, be disposed proximate to, or intersect the channel 236.

Figure 16E:
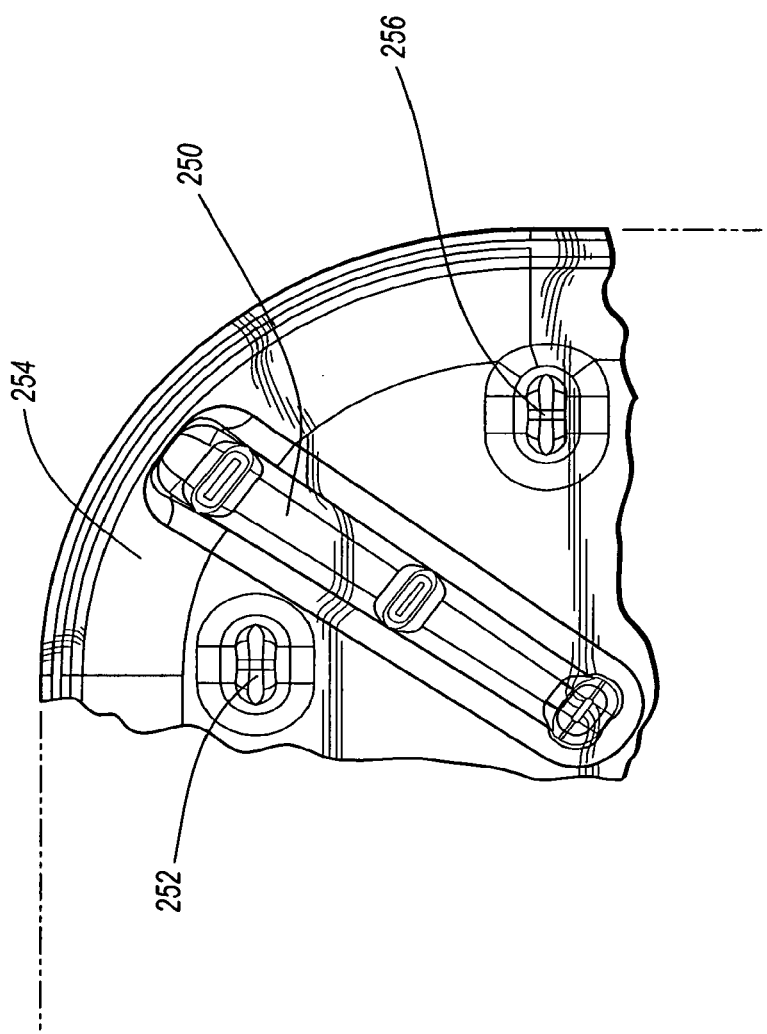
FIG. 16E is an enlarged bottom view of another portion of the table top shown in FIG. 16A.

As shown in FIG. 16E, a corner of the table top 220 may a reinforcing portion comprising a channel or groove 250. One or more depressions may be formed within the channel 250. A depression 252 may be formed on a lower surface of the table top 220, proximate an inner surface (such as, an inner surface 254) of a corner, and/or proximate the channel 250. Also, a depression 256 may be formed on the lower surface of the table top 220, proximate an inner surface of the corner, and/or spaced from the channel 250.

One skilled in the art will also appreciate that although the exemplary embodiments discussed above have been described with respect to table tops, these aspects and features may also be used in connection with other types of furniture such as chairs, stools, footstools, or any other suitable type of devices, fixtures, or structures.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A table top constructed from plastic, the table top comprising:
    an upper surface;
    a lower surface;
    a perimeter;
    a lip extending downwardly from the lower surface of the table top, the lip disposed at least proximate the perimeter of the table top, the lip including an inner surface, an outer surface and a hollow interior portion disposed between at least a portion of the inner surface and the outer surface, the inner surface, the outer surface and the hollow interior portion being integrally formed as part of a unitary, one-piece structure;
    one or more generally perpendicular reinforcement portions disposed in the lower surface of the table top, each of the one or more generally perpendicular reinforcement portions disposed at least substantially perpendicular to a portion of the lip; and
    one or more generally parallel reinforcement portions disposed in the lower surface of the table top, the one or more generally parallel reinforcement portions disposed at least substantially parallel to a portion of the lip.

2. The table top as in claim 1, wherein one or more of the generally perpendicular reinforcement portions are at least partially formed in the lower surface of the table top and the inner surface of the lip.

3. The table top as in claim 1, further comprising at least one depression disposed in one or more of the generally perpendicular reinforcement portions.

4. The table top as in claim 1, wherein the one or more generally perpendicular reinforcement portions are sized and configured to increase the strength of the table top.

5. The table top as in claim 1, wherein each of the one or more generally parallel reinforcement portions are spaced apart from the inner surface of the lip by a generally constant distance.

6. The table top as in claim 1, wherein one or more of the generally perpendicular reinforcement portions and one or more of the generally parallel reinforcement portions intersect.

7. The table top as in claim 1, wherein the one or more generally perpendicular reinforcement portions are separated by a smaller distance in a corner of the table top than a side of the table top.

8. The table top as in claim 1, further comprising one or more outwardly extending portions disposed between one or more of the generally perpendicular reinforcement portions.

9. The table top as in claim 1, wherein one or more of the generally perpendicular reinforcement portions are at least partially formed in the lower surface of the table top and the inner surface of the lip;
    wherein at least one depression is at least partially disposed within the portion of the reinforcement portion in the lower surface of the table top; and
    wherein at least one depression is at least partially disposed within the portion of the reinforcement portion in the inner surface of the lip.

10. The table top as in claim 1, wherein the one or more generally perpendicular reinforcement portions comprises at least two generally perpendicular reinforcement portions, a first generally perpendicular reinforcement portion having a first length and a second generally perpendicular reinforcement portion having a second length that is generally equal to or less than seventy percent of the first length.

11. A table top constructed from plastic, the table top comprising:
    an upper surface;
    a lower surface;
    an outer perimeter; and
    an attachment assembly in the lower surface of the table top, the attachment assembly sized and configured to attach at least a portion of a frame to the table top, the upper surface, the lower surface, the outer perimeter and the attachment assembly integrally formed as part of a unitary, one-piece structure, the attachment assembly comprising:
        a first engagement member disposed on a first side of the attachment assembly, the first engagement member including an engagement surface that engages a portion of the frame when the frame is attached to the table top;
        a second engagement member disposed on a second side of the attachment assembly, the second engagement member including an engagement surface that engages a portion of the frame when the frame is attached to the table top; and
        at least one depression at least partially disposed within the attachment assembly and extending towards the upper surface.

12. The table top as in claim 11, further comprising at least one depression at least partially disposed within the first engagement member.

13. The table top as in claim 11, further comprising a first depression at least partially disposed within the first side of the attachment assembly and a second depression at least partially disposed within the second side of the attachment assembly.

14. The table top as in claim 11, further comprising a first depression at least partially disposed within the first engagement member and a second depression at least partially disposed within the second engagement member.

15. A table top constructed from plastic, the table top comprising:
    an upper surface;
    a lower surface;
    a perimeter;
    a lip extending downwardly from the lower surface of the table top, the lip disposed at least proximate the perimeter of the table top, the lip including an inner surface, an outer surface and a hollow interior portion disposed between at least a portion of the inner surface and the outer surface, the inner surface, the outer surface and the hollow interior portion being integrally formed as part of a unitary, one-piece structure;

a first reinforcement portion disposed at least substantially perpendicular to the inner surface of the lip; and a second reinforcement portion disposed at least substantially parallel to the inner surface of the lip;

wherein the first reinforcement portion and the second reinforcement portion at least partially intersect.

16. The table top as in claim 15, further comprising at least one depression at least partially disposed within the first reinforcement portion.

17. The table top as in claim 15, wherein the first reinforcement portion is disposed in the lower surface of the table top and the inner surface of the lip.

18. The table top as in claim 17, further comprising at least one depression in the lower surface of the table top and at least one depression in the inner surface of the lip of the first reinforcement portion.

19. The table top as in claim 15, wherein the first reinforcement portion has an elongated body disposed generally perpendicular to the inner surface of the lip in a corner of the table top; and wherein the second reinforcement portion comprises a channel in the lower surface of the table top.

20. The table top as in claim 15, wherein the second reinforcement portion comprises a channel that is spaced apart from the inner surface of the lip by a generally constant distance.

* * * * *

UNITED STATES PATENT AND TRADEMARK OFFICE
CERTIFICATE OF CORRECTION

| | | |
|---|---|---|
| PATENT NO. | : 8,746,155 B2 | Page 1 of 1 |
| APPLICATION NO. | : 13/939048 | |
| DATED | : June 10, 2014 | |
| INVENTOR(S) | : Haney et al. | |

It is certified that error appears in the above-identified patent and that said Letters Patent is hereby corrected as shown below:

In the Specification

In Column 11, Line 20, delete "there" and insert -- their --, therefor.

Signed and Sealed this
Ninth Day of September, 2014

Michelle K. Lee
*Deputy Director of the United States Patent and Trademark Office*